United States Patent
Baumann et al.

(10) Patent No.: US 6,872,255 B2
(45) Date of Patent: Mar. 29, 2005

(54) DEVICE FOR PROCESSING AN ELECTRICALLY CONDUCTIVE COMPONENT

(75) Inventors: Thomas Baumann, Wettingen (CH); Albrecht Bock, Hohentengen (DE); Joerg Oesterheld, Birmenstorf (CH)

(73) Assignee: Alstom Technology LTD, Baden (CH)

( * ) Notice: Subject to any disclaimer, the term of this patent is extended or adjusted under 35 U.S.C. 154(b) by 55 days.

(21) Appl. No.: 09/996,876

(22) Filed: Nov. 30, 2001

(65) Prior Publication Data

US 2002/0096345 A1 Jul. 25, 2002

(30) Foreign Application Priority Data

Nov. 30, 2000 (DE) .......................................... 100 59 384

(51) Int. Cl.⁷ ................................................ B05C 5/00
(52) U.S. Cl. ...................................... 118/300; 361/144
(58) Field of Search ................................. 118/300, 323; 148/103, 108; 294/65.5; 361/144; 335/285

(56) References Cited

FOREIGN PATENT DOCUMENTS

| | | |
|---|---|---|
| DE | 41 05 874 | 7/1992 |
| DE | 42 10 188 | 10/1993 |
| DE | 34 02 143 | 5/1994 |
| DE | 195 01 570 | 9/1996 |
| DE | 195 01 571 | 9/1996 |
| DE | 196 11 801 | 10/1997 |
| DE | 196 37 201 | 2/1998 |
| DE | 44 36 651 | 8/1998 |
| DE | 199 16 922 | 10/2000 |
| EP | 0 790 623 | 8/1997 |
| EP | 1035643 | * 3/2000 .......... H02N/15/00 |
| WO | WO 99/17034 | * 4/1999 ............. F16F/6/00 |

OTHER PUBLICATIONS

Derwent, English Abstract of JP 02185975 (Vapour coating wafer at sub–stmoshpheric pressure—with non–contact support e.g. with magnetic force or gas lift), Jan. 11, 1989.*

* cited by examiner

*Primary Examiner*—Chris Fiorilla
*Assistant Examiner*—Michelle Acevedo Lazor
(74) *Attorney, Agent, or Firm*—Burns, Doane, Swecker & Mathis, L.L.P.

(57) ABSTRACT

A device for processing an electrically conductive component includes positioning means that position the component to be processed in a processing position. The positioning means are provided with means for generating a magnetic field. The magnetic field generates forces that act contactless on the component and in this way bring about or support the positioning of the component.

15 Claims, 4 Drawing Sheets

DEVICE FOR PROCESSING AN ELECTRICALLY CONDUCTIVE COMPONENT

FIELD OF THE INVENTION

The invention relates to a device for processing an electrically conductive or permanently magnetic component and to a method for producing a coating on an electrically conductive or permanently magnetic component. Of special interest in this context are components in the form of electric conductors or conductor bundles that must be provided with electrical insulation. Such insulated electrical conductors are used, in particular, for rotating electrical machines, for example, generators, in the form of stator coils, Roebel bars, and exciter conductors. Other examples of possible uses include switching installations and transformers.

BACKGROUND OF THE INVENTION

In a standard procedure for insulating conductors or conductor bundles of a rotating electrical machine, tapes, consisting, for example, of a fiber-glass carrier and mica paper, are wrapped in layers in a spiral shape around the conductor, for example, a stator conductor, until the desired insulation thickness is achieved. Such an insulation tape and associated method are described, for example, in EP 0 790 623 B1.

By using an impregnation, for example, with a suitable synthetic resin, any remaining air can be purged from the resulting insulation winding, whereby the tape layers are at the same time bonded to each other. The insulation receives its final shape by hardening in a suitable mold.

In modern methods for producing an insulation, a suitable, powdered or liquid insulation agent is applied to the component to be insulated. This is done, for example, by a suitable spraying process or another suitable coating process.

In larger components that must undergo such processing, the problem exists, however, that these components bend as a result of their own weight, if they are only supported at their end sections. However, if a coating, in particular, an insulation, is applied when such a deformation is present, the coating or insulation can be damaged in the installed condition of the component. This problem is encountered, for example, with bar-shaped conductors that may have a length of several meters.

To avoid the mentioned disadvantages, for example, winding robots that have several holding pliers for holding the bar-shaped conductors at several points, and in this way support it, are used. To permit the application of a winding on the conductor at such holding pliers point, the respective holdings pliers open and move away automatically. Once the respective support point has been wound, the corresponding holding pliers returns to its support position and closes again to restore the support of the conductor. However, such a procedure is not suitable for coatings that work with coating agents that must harden immediately after their application. The reason for this is that the holding pliers can only return to their holding positions and touch the component for support once this hardening process at the respective holding point has been completed. A numerical example will make this problem clear: A bar-shaped conductor is supposed to be provided with insulation over a length of 10 meters. In order to prevent bending of the bar, the bar is fixed over the length to be coated with 10 holding pliers. The insulation is supposed to be applied using a spraying method, working, for example, an application speed of 1 m/s. In the example, the hardening of the sprayed-on insulating agent shall take 1 minute. Accordingly, the spray application must be interrupted for approximately 1 minute after moving past each holding point, or the application speed must be reduced to 1 m/min until the released holding pliers is again able to assume its support function. Overall, this results in a total application time of approximately 10 minutes. This means that the coating of such conductors takes much longer than the actual spraying process with a speed of 1 m/s. The coating could indeed be accelerated by providing fewer support points, but this again would mean that a greater bending would have to be tolerated. Such a coating, applied by using such a frequently interrupted spraying process, also does not have an especially high quality, in particular with respect to homogeneity.

SUMMARY OF THE INVENTION

The present invention attempts to disclose possibilities for permitting a quick processing or coating of the component with respect to the processing of an electrically conductive or permanently magnetic component, in particular for the production of a coating on such a component.

The invention is based on the idea that the component is positioned contactless, at least in the section to be processed, by means of magnetic field or, specifically, by the forces that cause these magnetic fields. Since the position in the section to be processed does not require a physical contact between the component and any support device, such as, for example, holding pliers, an application of a coating that must be hardened also is not able to cause an interfering interaction between these support device and the applied, but not yet hardened coating. The advantage of the invention becomes especially clear with respect to the above numerical example: A coating of a 10 m long conductor now takes only approximately 1 minute. The coating also can be realized with high quality in the section that is positioned contactless.

The physical principle of contactless, magnetic positioning is the fact that bodies that generate a magnetic field exert forces attracting or repelling each other. The forces hereby are oriented vertically to the magnetic fields. Parallel-oriented magnetic fields generate attractive forces, anti-parallel-oriented magnetic fields generate repelling forces. The occurrence of forces between the bodies requires that both bodies generate a magnetic field. The contactless positioning according to the invention therefore requires that the object itself is able to generate a magnetic field. The positioning of the object then takes place—in general—by superimposing the magnetic field generated by the object with a magnetic field generated by one or more suitably shaped magnetic field generation device(s). It is preferred that these external magnetic field generation devices (MGM) are designed so that they counteract the weight force of the component. This measure reduces a gravity-induced bending of the component.

In an especially advantageous embodiment, the MGM can be constructed so that the sizes of the forces generated by the magnetic fields are such that they essentially compensate the gravity-induced bending of the component at least in the part to be processed. In this embodiment, optimum values can be achieved for a coating to be applied.

Magnetic fields are generated on the one hand by magnetization of ferromagnetic materials (permanent magnets), and on the other hand by energizing electrically conductive materials. Since there are many more electrically conductive materials then permanently magnetic materials, this is the more important technical application. The present invention therefore preferably is used for objects made from electrically conductive materials. It is hereby useful that time-constant magnetic fields and direct current are used, since this is the only way to achieve a positioning constant over time. Naturally, it is also possible with direct current to control the object position suitably by adjusting the current intensity.

According to a further development, the magnetic field generation device can be constructed so that the forces generated by the magnetic field have components that are oriented transversely to the force of gravity, act symmetrically on the component, and center it. These measures realize a lateral guidance and stabilization of the component in its processing position.

According to an alternative embodiment of the present invention, the magnetic field generation device may be provided with an electrical conductor arrangement of at least one electrical conductor, whereby the conductor arrangement is connected to a power supply and extends below or above the respective component in the same direction as the component, whereby the magnetic field generation devices are also provided with electrical connection means with which the component can be connected to a power supply, whereby for the positioning of the component in its processing position the electrical conductor arrangement and the component are energized in such a way that between the component and the conductor arrangement a repelling force or attractive force that brings about or supports the positioning of the component is created. Such an embodiment is particularly useful if the component to be processed is a relatively long component, in particular, a bar-shaped component, such as an electrical conductor or conductor bundle of, for example, a rotating electrical machine. If the conductor arrangement is located above the component, component and conductor arrangement are energized with currents oriented in the same direction, i.e., parallel currents, in order to create an attractive force. If, however, the conductor arrangement is located below the component, component and conductor arrangement are energized with currents oriented in the opposite directions, i.e., anti-parallel currents, in order to create a repelling force.

In an another embodiment of the present invention, the MGM includes a conductor arrangement of a coil system of the above described type, which is constructed on a core of ferromagnetic material, for example ferritic steel. The high magnetic permeability causes the magnetic field of the MGM to be significantly increased, which means that the forces are significantly increased.

The invention hereby is based on the general idea of bringing about the positioning of the component, at least in a section to be coated, by magnetic forces with sizes that cause the component to freely float at least in the section to be coated, so that it can be coated without physical contact. The advantage hereby is again that the section to be coated can be coated completely using a continuous coating process, which permits a coating with a higher quality.

BRIEF DESCRIPTION OF THE DRAWINGS

Preferred embodiments of the invention are disclosed in the following description and illustrated in the accompanying drawings, in which.

DETAILED DESCRIPTION OF THE PREFERRED EMBODIMENTS

Figure 1:
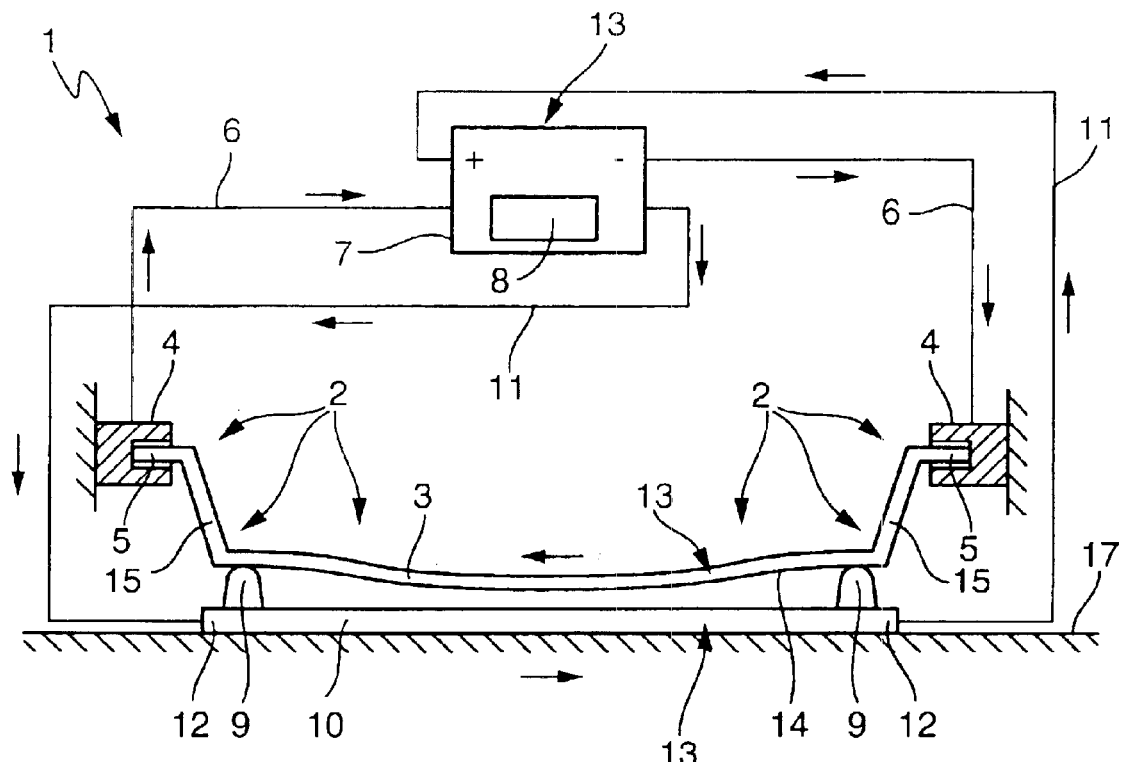
FIG. 1 shows a lateral view of a greatly simplified device according to the invention, with disabled magnetic field generation devices.
Figure 2:
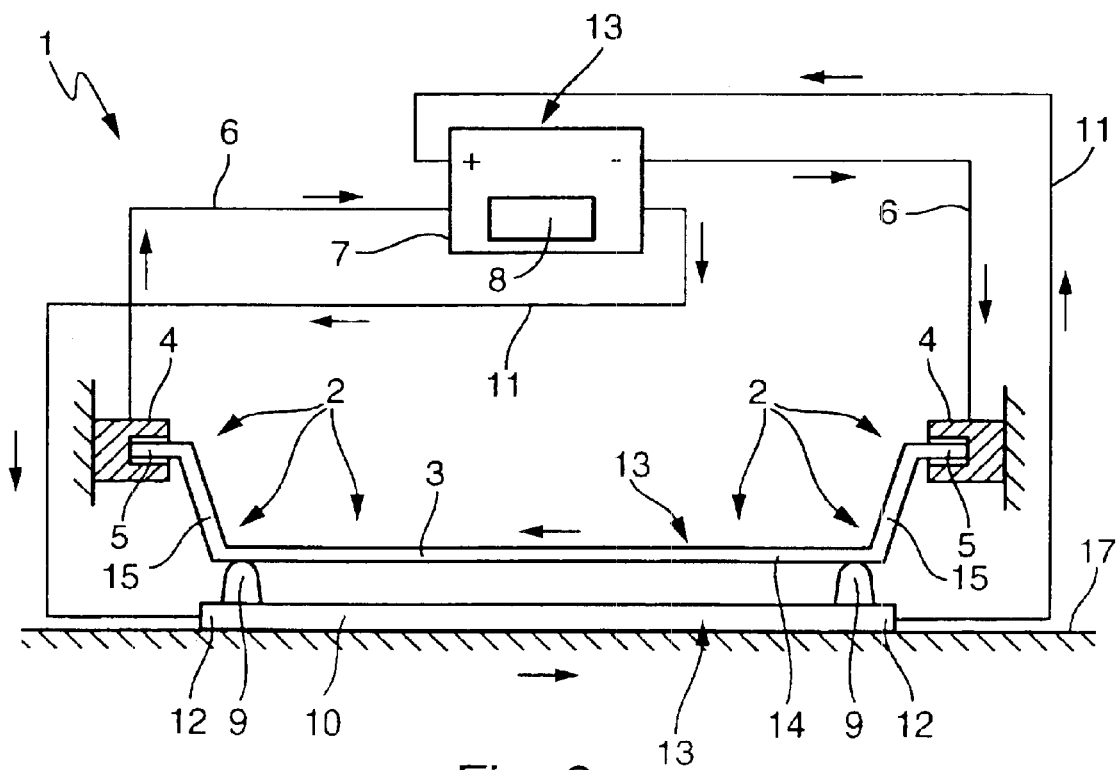
FIG. 2 shows a view according to FIG. 1, but with enabled magnetic field generation devices.
Figure 3:
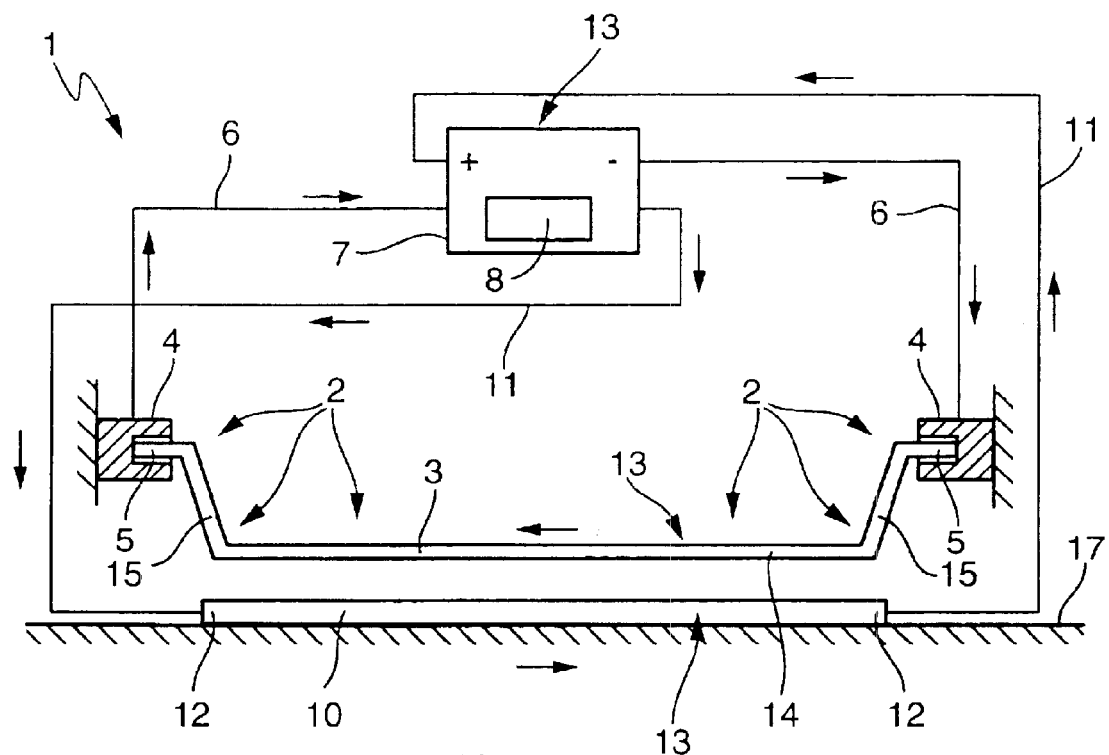
FIG. 3 shows a view according to FIG. 2, but with disabled support devices.

According to FIG. 1 to 3, a device 1 according to the invention is provided with positioning device 2, with which a component 3 can be positioned in a processing position. This processing position is shown in FIG. 2 and 3.

Component 3 is made of an electrically conductive material and, in the present embodiment, is formed by a tape- or bar-shaped electrical conductor used, for example, in a rotating electrical machine, for example, a turbo generator. Component 3 may be, for example, a so-called Roebel bar. In the present embodiment, component 3 is constructed so that a center section 14 to be processed is connected at its ends via an angled section 15 with end sections 5.

The positioning devices 2 are provided with holding members 4 that hold the end sections 5 of the component 3 in order to fix it there. The holding members 4 therefore form a holder for the component 3 and can be constructed, for example, of pliers or similar devices. The holding members 4 in the present embodiment are constructed at the same times as electrical connections that are connected via corresponding power lines 6 with a power supply 7. The power supply 7 is provided with a control 8 that permits a supply of the connections or holding members 4 with power. The current flow direction is hereby symbolized for a certain time by arrows.

The positioning members 2 also have support members 9 that support the component 3 from below in relation to an electrical conductor arrangement 10. The support members 9 are made of an electrically insulated material and are sized so that the component 3 does not contact the conductor arrangement 10 in the case of gravity-induced bending. This bending of the component 3 caused by gravity is shown in FIG. 1.

The electrical conductor arrangement 10 includes one or more electrical conductors that, in the shown embodiment, are formed by one or more parallel bars resting on a bottom 17. The conductor arrangement 10 is hereby oriented in the same direction as the component 3, so that in the embodiment the longitudinal directions of the component 3 and of the conductor arrangement 10 extend horizontally and are located in the drawing plane.

The conductor arrangement 10 is also connected at its ends 12 via suitable power lines 11 with power supply 7. It should be noted hereby that the ends 12 of the conductor arrangement 10 and the ends 5 of the component 3 are connected in opposite direction, i.e., anti-parallel, to the power supply 7.

The device 1 according to the invention functions as follows:

The component 3 to be processed is placed onto the support members 9 and is fixed at its ends 5 to the holding members 4. Since the holding members 4 are constructed as connection members, the ends 5 are connected by the attachment automatically to the power supply 7. Because of the weight of the component 3, a gravity-induced bending according to FIG. 1 occurs between its ends 5.

The positioning members 2 are provided with magnetic field generation devices 13, the essential components of which are the conductor arrangement 10, component 3, and power supply 7. FIG. 1 shows these magnetic field generation devices 13 disabled, so that the component 3 takes on the sagging or bending shape shown in FIG. 1, which is however not suitable for the intended processing of the component 3.

In FIG. 2, the magnetic field generation devices 13 are enabled. For this purpose, the control 8 supplies the component 3 and conductor arrangement 10 with power. As a result of the applicable laws of physics, this generates a magnetic field that results in a mutual repulsion between component 3 and conductor arrangement 10. The positioning of the conductor arrangement 10 and the applied currents have hereby been chosen so that the component 3 in the section 14 to be processed is oriented essentially horizontally.

The number of conductors in the conductor arrangement 10, their spatial arrangement, and their power supply are preferably chosen so as to compensate the gravity-induced bending of the component 3. Hereby it is not necessary that the magnetic field generation devices 13 absorb the complete force of the weight, since part of the force of the weight is taken up by the holding members 4.

According to FIG. 3, the support members 9 are constructed so that they can be disabled or removed so that the component 3 is supported in its section 14 to be supported exclusively by the magnetic forces. FIG. 3 expressly shows that a floating state for the component 3 quasi occurs when the magnetic field generation devices 13 are enabled and the support members 9 are disabled; in this state, the component 3 is supported contactless in its section 14 to be processed. In this state, the desired processing of the component 3 now can be performed. For example, the component 3 should be provided with an insulated coating applied, for example, by a spraying process. For this, a hardening insulation material that only can be exposed to mechanical stresses following a hardening time can be used.

After the respective coating has hardened, the support members 9 can be activated again. Once the magnetic field generation device 13 have been disabled again, the processed or coated component 3 can be removed from the device 1 again.

While the support members 9 in the embodiment described here comprise only two support points, another embodiment provides that support constructions as complicated and complex as desired may be provided, the support members preventing a gravity-induced bending of the component 3 especially also when the magnetic field generation devices 13 are disabled.

In the case of the embodiment shown here, the component 3, as described above, is a long, electrical conductor of an electrical machine that is straight in the section to be processed. However, the invention also can be used for other electrically conductive components with any desired shapes. A suitable conductor arrangement 10 that generates a magnetic field whose forces compensate the gravity-induced bending of this component 3 with its complex shape also can be found for components 3 of any desired shape. In order to find a suitable conductor arrangement 10, the component 3 can be divided into infinitesimal parts, which are then associated with corresponding sections of the conductor arrangement 10. The suitable magnetic field hereby also can be generated by corresponding shape and/or spatial positioning of the conductor arrangement 10.

Figure 4:
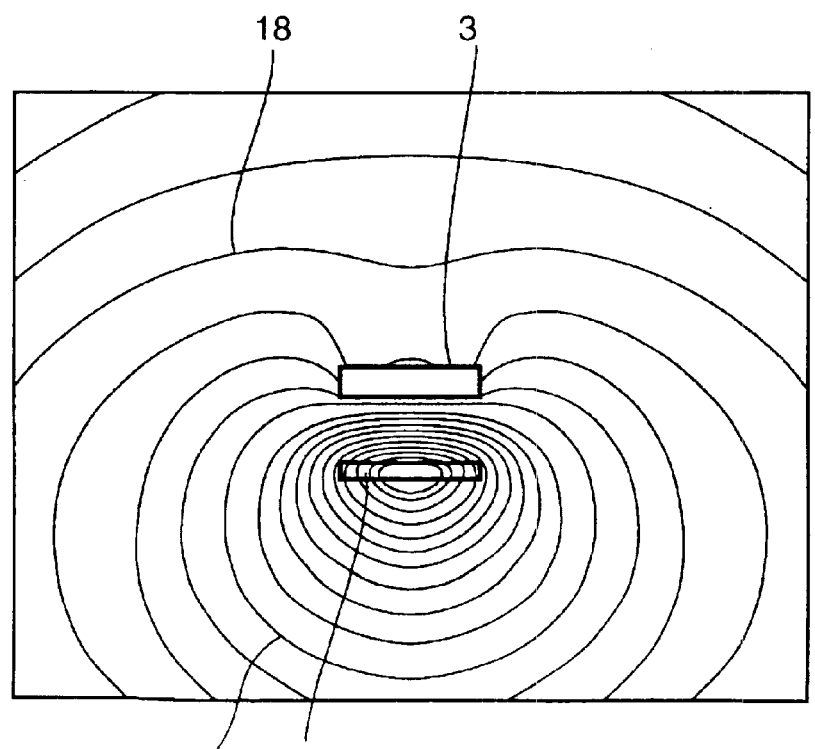
FIG. 4 shows a principal view of the field line progression in a plane transversely to the longitudinal direction of a component to be processed, for a first embodiment of an electrical conductor arrangement with an anti-parallel power flow extending parallel to the component.

According to FIG. 4, the conductor arrangement 10 in an especially simple embodiment includes a single conductor constructed in a bar shape, which principally may have any kind of cross-section. However, in the embodiment at hand a rectangular cross-section has been chosen, since the component 3 located above it also has a corresponding rectangular cross-section. In a single conductor 10, the repelling forces acting between the conductor 10 and the component 3 extend only exactly vertical in a vertical longitudinal center plane. The resulting field line progression of the induced magnetic field is shown symbolically with individual field lines 18. As a result, the magnetic repelling forces are therefore, with respect to the positioning of the component 3 vertically above the conductor 10, relatively unstable, so that a lateral support of the component 3 may be necessary. In shorter components 3, this lateral support can be realized in a simple manner with holding members 4. In longer components 3, additional measures may be necessary.

Figure 5:
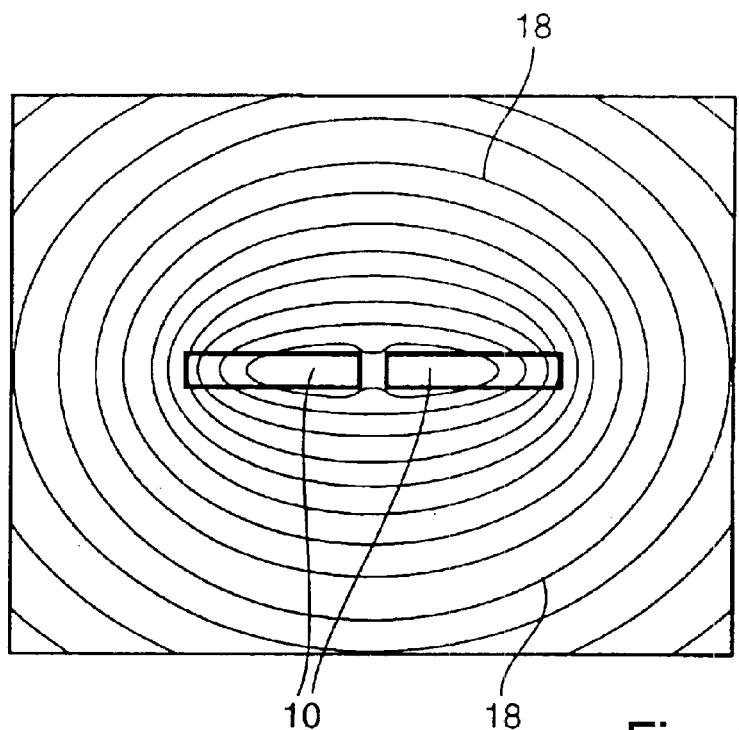
FIG. 5 shows a view corresponding to FIG. 4, but for a second embodiment of the conductor arrangement.

According to FIG. 5, the conductor arrangement 10 may be constructed of an arrangement of two bar-shaped conductors arranged next and parallel to each other. This conductor arrangement 10 is energized consistently in the same direction, i.e., parallel. The resulting field lines 18 extend flatter above the conductor arrangement 10 than is the case for the single conductor according to FIG. 4. In this way, the instability of the component 3 held floating above the conductor arrangement 10 is reduced, and the stability is increased. The component 3 is not shown in FIG. 5.

Figure 6:
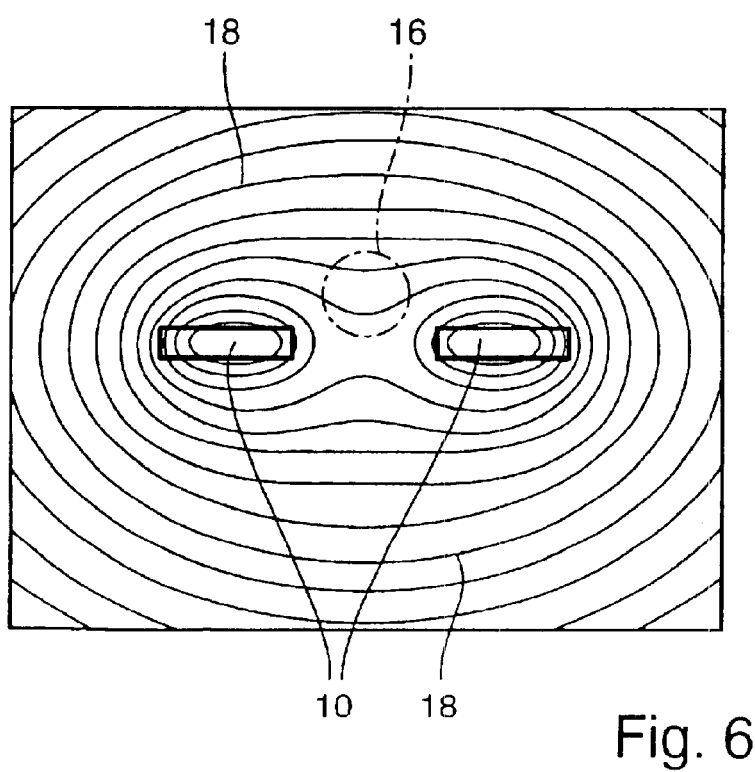
FIG. 6 shows a view corresponding to FIG. 4, but for a third embodiment of the conductor arrangement.

In FIG. 6, the distance between the two conductors of the conductor arrangement 10 also has been increased. This measure causes a magnetic field to be generated w hose field lines 18 form a dip in the area of a vertical longitudinal center plane. The area of this dip is designated as 16 in FIG. 6. With an arrangement of the component in the area of this dip 16, magnetic forces with components that gave a centering effect are applied to the component 3. This centering results from forces that are symmetrically applied transversely to the longitudinal direction of the component 3 and transversely to the force of gravity at both sides of the component 3. Accordingly, this results in a stable positioning of the component 3 that does not require mechanical lateral supports.

Figure 7:
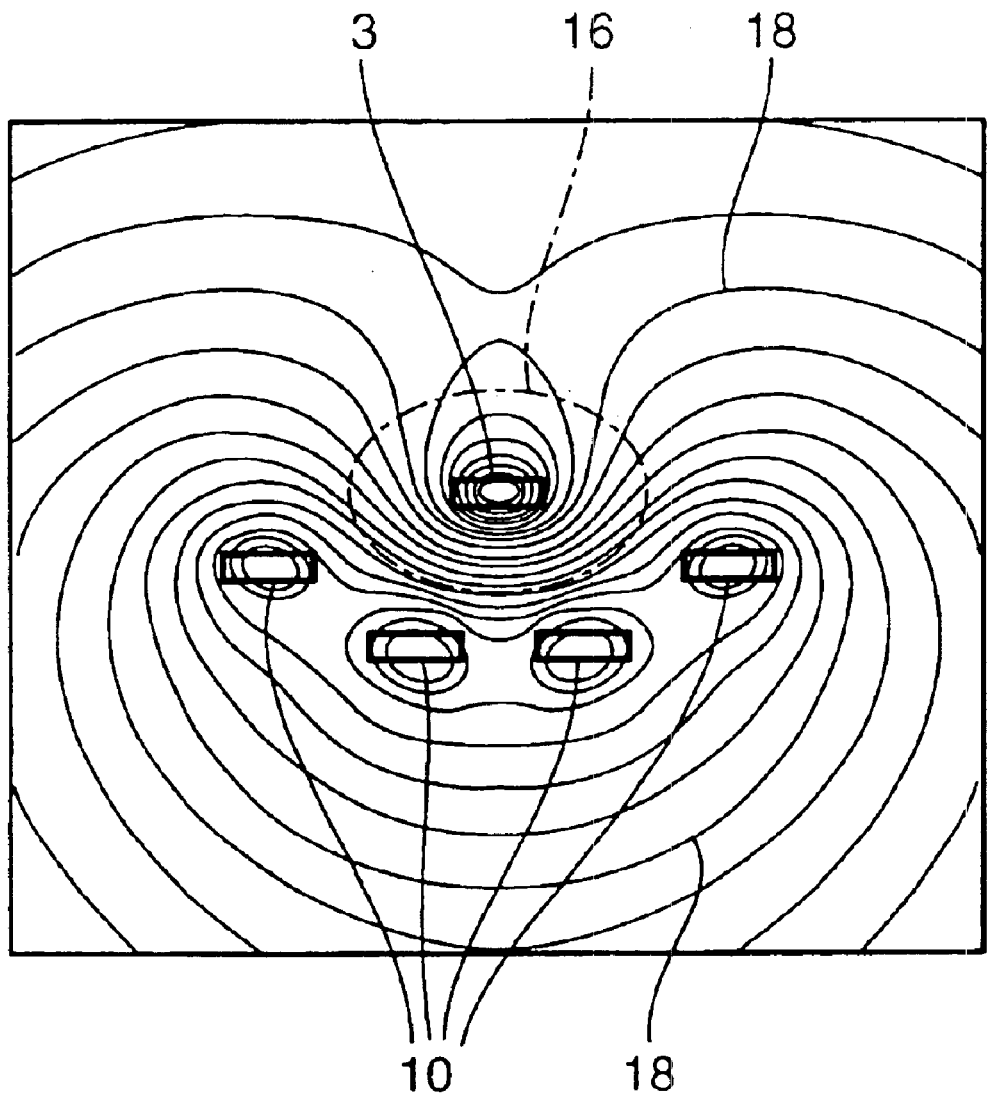
FIG. 7 shows a view corresponding to FIG. 4, but for a fourth embodiment of the conductor arrangement.

FIG. 7 shows a further embodiment in which the design of the dip 16 above the conductor arrangement 10 is additionally reinforced. This reinforcement is hereby realized with the help of two additional conductor bars that are arranged in relation to the horizontal longitudinal center plane further outward, and in relation to the conductor bars located further inward, are located further up. This measure reinforces the stable position of the component 3 that is in a floating state above the conductor arrangement 10.

The principles, preferred embodiments and manner of use of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A fixation and positioning device for fixing and positioning a component while applying a process, wherein the component is one selected from the group consisting of a direct current supplied component, a permanently magnetic component, and a direct current supplied permanently magnetic component, the component being subjectable to a first magnetic field, the device comprising:

a first mechanical fixation means and a second mechanical fixation means, spaced a distance apart from each other, and arranged and adapted to receive the component between the first and the second mechanical fixation means; and a magnetic field generation device arranged and adapted to generate a second magnetic field, which, in co-action with the first magnetic field, effects a force to support the component against its gravitational force along a distance between the first mechanical fixation means and the second mechanical fixation means.

2. The fixation and positioning device as claimed in claim 1, wherein the magnetic field generation device is arranged and adapted such that the forces co-effected by the magnetic fields comprise field components which are oriented transversely to the gravitational force and act symmetrically on the component, thus centering the component.

3. The fixation and positioning device as claimed in claim 1, wherein the magnetic field generation device is constructed and dimensioned such that the magnitude of the forces co-effected by the first and second magnetic fields essentially compensate a gravity induced bending of the component along the distance between the first and the second mechanical fixation means.

4. The fixation and positioning device as claimed in claim 1, wherein the magnetic field generation device is arranged essentially between the first and second mechanical fixation means.

5. The fixation and positioning device as claimed in claim 1, the magnetic field generation device extending essentially in the same direction as the component to be held by the first and the second mechanical fixation means.

6. The fixation and positioning device as claimed in claim 1, the magnetic field generation device comprising a member made from a permanently magnetic ferromagnetic material.

7. The fixation and positioning device as claimed in claim 1, the magnetic field generation device comprising an electrically conductive member, said member being provided with electrical connection means.

8. The fixation and positioning device as claimed in claim 7, wherein the electrically conductive member comprises a coil arranged around a core of ferromagnetic material.

9. The fixation and positioning device as claimed in claim 7, wherein the electrically conductive member is connected to a power supply.

10. The fixation and positioning device as claimed in claim 9, wherein the first and the second mechanical fixation means are connected to a power supply.

11. The fixation and positioning device as claimed in claim 10, wherein the first and second mechanical fixation means and a conductive member of the magnetic field generation device are connected to a common power supply.

12. The fixation and positioning device as claimed in claim 10, wherein the first and second mechanical fixation means are connected to a power supply, and a conductive member of the magnetic field generation device is arranged below the component, and extending essentially parallel with the component, wherein the current direction in the component is opposite to that in the conductive member.

13. The fixation and positioning device as claimed in claim 1, wherein first and the second mechanical fixation means constitute electrical connection means.

14. The fixation and positioning device as claimed in claim 1, further comprising support members arranged and adapted to support the component when the magnetic field forces are not active.

15. The fixation and positioning device as claimed in claim 1, comprising a spraying member for producing a coating on the component.

* * * * *